Jan. 22, 1957  G. H. LANGSTON  2,778,671
PIPE HANDLING DEVICE

Filed April 24, 1952  2 Sheets-Sheet 1

Gladstone H. Langston
INVENTOR.

BY
Charles E. Lightfoot
ATTORNEY

Jan. 22, 1957

G. H. LANGSTON 2,778,671

PIPE HANDLING DEVICE

Filed April 24, 1952

Gladstone H. Langston
INVENTOR.

BY Charles E. Lightfoot
ATTORNEY

United States Patent Office 2,778,671
Patented Jan. 22, 1957

2,778,671

PIPE HANDLING DEVICE

Gladstone H. Langston, Texas City, Tex.

Application April 24, 1952, Serial No. 284,037

4 Claims. (Cl. 294—95)

This invention relates to a pipe handling device, and more particularly to a device adapted to be inserted in a section of pipe and to be expanded therein into gripping engagement with the interior thereof, whereby the pipe may be readily moved from one location to another.

In handling sections of pipe or tubing it has been customary, heretofore, to use a chain or cable, which may be looped or wrapped about a section of pipe, so that the same may be dragged to the desired location. Such a method, however, presents the serious disadvantage that the chain or cable is subjected to abrasion by contact with the ground, and rapidly becomes worn, necessitating frequent replacements. Sections of pipe or tubing are also frequently stored in piles or stacks by laying the sections one against or upon another, and in order to conserve space several sizes of pipe are frequently placed in the same stack. When so arranged a difficult problem is encountered in removing sections of pipe located beneath other sections in the pile or stack, making it necessary, at times, to first remove a number of sections, before the desired one may be reached, which results in the expenditure of much unnecessary time and labor.

The present invention has for an important object the provision of a pipe-handling device by which a section of pipe can be conveniently gripped on the inside and readily pulled from beneath superimposed sections in a pile or stack.

Another object of the invention is to provide a pipe-handling device which may be inserted in a retracted condition in a pipe and expanded therein to engage and grip the inside of the pipe.

A further object of the invention is the provision of a pipe-handling device which is adapted to grip the inside of the section of pipe, and which is constructed to operate upon the exertion of a pulling force on the device to cause the same to more tightly grip the pipe.

A still further object of the invention is to provide pipe-handling mechanism, of the type referred to, which is adapted for use with different sizes of pipe, and which is easily and conveniently inserted into and removed from a pipe and adjusted therein to engages or released position.

The above objects and advantages of the invention will best be understood from the following detailed description, constituting a specification of the same, when taken in conjunction with the annexed drawings, wherein—

Figure 1:
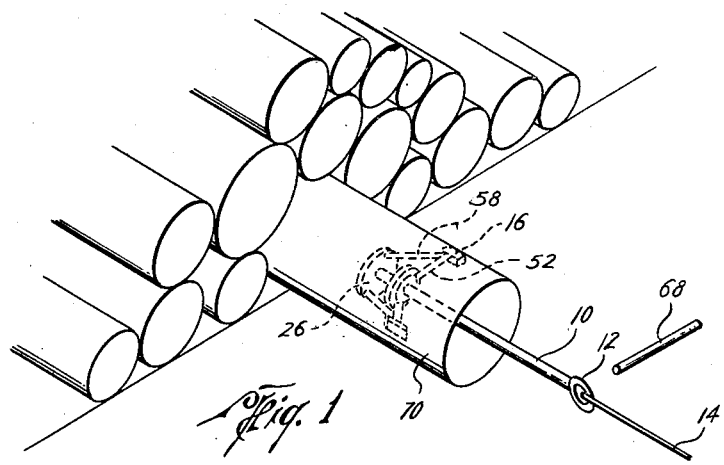
Figure 1 is a perspective view, showing one end of a pile or stack of pipe sections, and illustrating the use of the invention in facilitating the removal of a section of pipe from such a stack.
Figure 2:
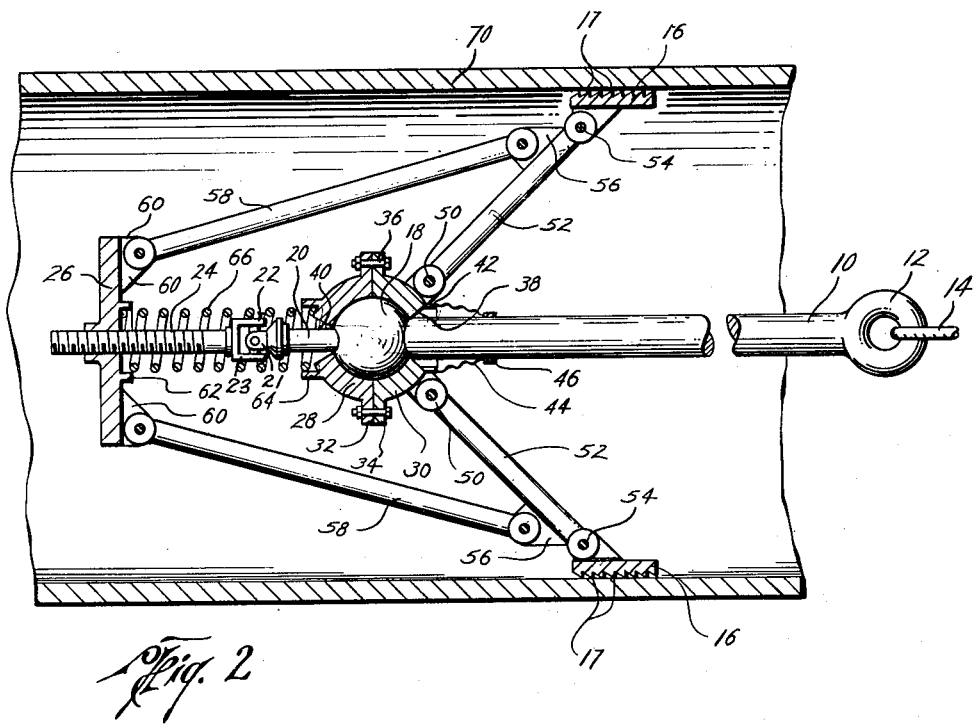
Figure 2 is a cross-sectional view, taken along the line 2—2 of Figure 4, looking in the direction indicated by the arrows, and showing the invention in operative position within a section of pipe which is to be moved.
Figure 3:
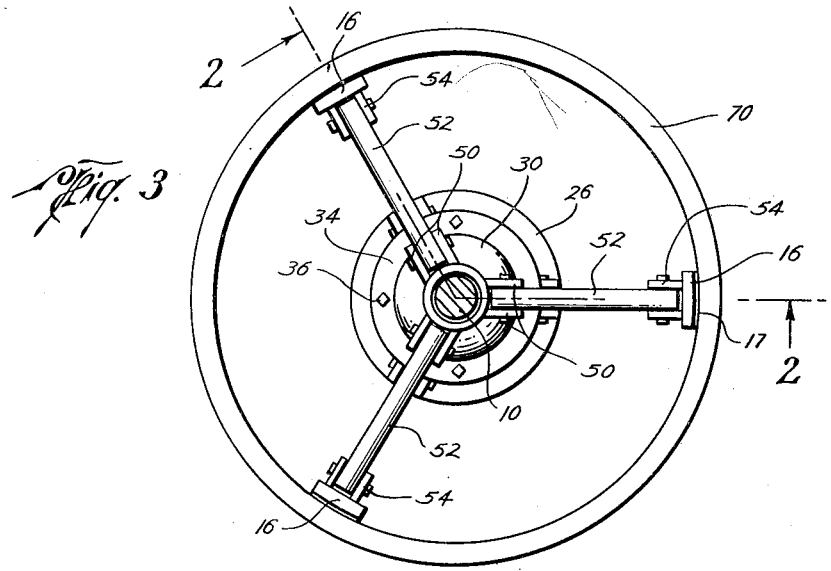
Figure 3 is an end view of the invention, looking at the right hand end of the same as illustrated in Figure 2.
Figure 4:
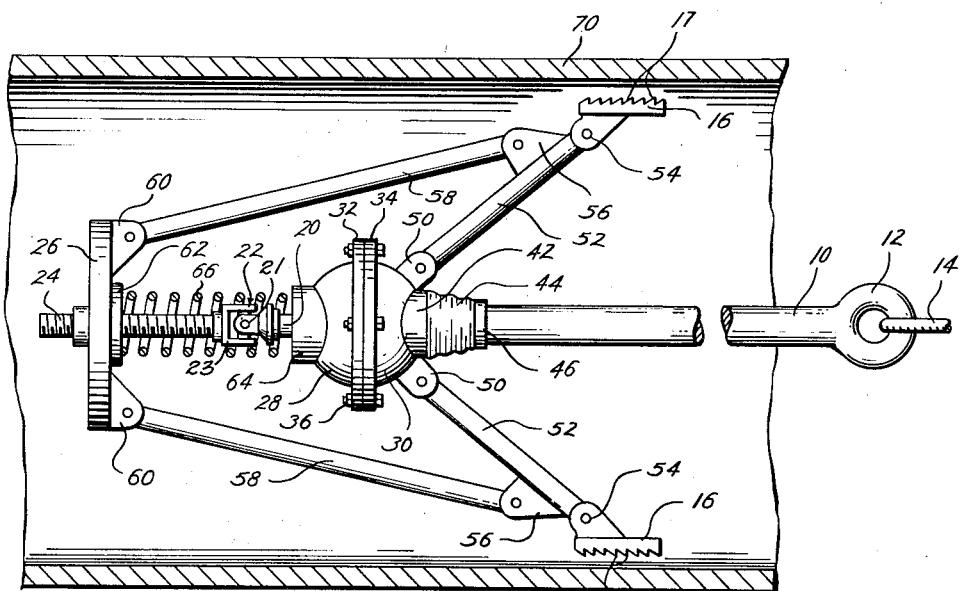
Figure 4 is a side elevational view, showing the invention in retracted or released position within a section of pipe.

Referring now to the drawings in greater detail, wherein like numerals of reference designate the same parts throughout the several views, the invention comprises an operating shaft 10, having at one end an eye 12 for the attachment thereto of a cable 14, or the like, and carrying at its other end mechanism for expanding a plurality of gripping members 16, into or retracting the same out of engagement with the inside of a section of pipe, whereby the device may be securely anchored to the pipe for moving the same to any desired location.

The shaft 10 is formed, or otherwise provided with a bearing in the form of a ball 18, and has a rod-like extension 20 projecting beyond the ball, to the outer end of which one element 21 of a universal joint 22 is connected. The other element 23 of the universal joint 22 is attached to one end of an externally threaded bolt 24, which is threadably received in a connector member in the form of a central opening in a plate 26, whereby the connector member is adjustably carried by the bolt for movement therealong upon rotation of the operating shaft 10.

A bearing support or casing in the form of a housing, formed into sections 28 and 30, having external flanges 32 and 34, respectively, adapted to be secured together by means of bolts 36, or the like, passing through the flanges, encloses the bearing 18. The operating shaft 10 extends through a central opening 38 in the casing section 30, and the extension 20 extends through an inwardly tapering opening 40 located centrally of the casing section 28 and opposite the opening 38 of the casing. The ball 18 is freely rotatable in the casing by rotation of the operating shaft 10, so that the shaft 10 and the extension 20 are securely held against longitudinal movement relative to the casing, but may be freely rotated therein, and because of the tapered openings 38 and 40 the shaft 10 and extension 20 may have limited angular movement relative to the casing. The universal joint 22 also permits the shaft 10 to move angularly relative to the connector member 26.

An annular flange 42 may be provided about the opening 38 to which a flexible sleeve 44 may be attached, which sleeve is also attached to a ring 46 surrounding the shaft 10, whereby foreign matter may be excluded from the opening 38 of the casing.

Peripherally spaced pairs of lugs 50 are provided on the casing section 30, and a radially extending arm 52 is pivotally secured between each of the pairs of lugs. At its outer end each of the radially extending arms 52 carries anchoring means in the form of a toothed pipe gripping member or slip 16, pivotally secured thereto, as indicated at 54, and mediate the ends of the arms lugs 56 are formed or attached, to each of which a link 58 is pivotally secured at one end. The opposite ends of the links 58 are pivotally secured to corresponding lugs 60, on the connector plate 26. The gripping elements 16 are preferably provided with teeth 17, shaped to bite into the inside of a pipe or tube in a manner to resist withdrawal of the device from the same when in gripping engagement therein.

The plate 26 may have an annular flange 62 formed thereon surrounding the bolt 24, and the casing section 28 may also have an annular flange 64 surrounding the opening 40, whereby a flexible sleeve, or the like, not shown, may be attached at its opposite ends to these flanges, to effectively enclose the universal joint 22 and prevent the entrance of foreign matter into the opening 40. Resilient means, such as a coiled spring 66 is received at one end within the flange 64 of the casing section 28, and at its other end within the flange 62 of the plate 26, this spring serving to urge the casing away from the plate 26.

It will be appreciated that as many radially extending arms 52 with their corresponding links 58 may be provided about the peripheries of the casing and plate as may be desirable or expedient, depending upon the size of the pipe sections which are to be handled with the device. In the case of pipe sections of very large diameter, a greater number of pipe-engaging elements or slips 16, than the three such elements in the present illustration, may be required, in order to provide secure anchoring of the device within the pipe. It will also be appreciated that various types of pipe engaging elements or slips may be employed, depending upon the particular size and kind of pipe sections with which the device is to be used.

In making use of the invention the operating shaft 10 is first rotated in a direction to decrease the distance between the casing and the plate 26, whereby the links 58 will be moved in a direction to swing the arms 52 radially inwardly toward the operating shaft, thus retracting the pipe-engaging elements 16. The device in its retracted condition may then be inserted in a section of pipe, indicated at 70, which is to be moved, and when located at the desired position therein, the operating shaft 10 may be rotated in the opposite direction to expand the elements 16 into gripping engagement with the inside of the pipe. When the device has been positioned in the pipe in the manner described, some of the pipe engaging elements 16 will be in contact with the inside of the pipe, so that the device will be held against rotation in the pipe during further rotation of the operating shaft 10. With the parts arranged as illustrated, it will be apparent that the greater the pulling force exerted on the shaft 10, the more tightly the pipe-engaging elements 16 will be forced into contact with the inside of the pipe, thus effectively preventing any slipping of the gripping element, and securely anchoring the device in the pipe.

The relative angular movement between the shaft and the bearing support or casing and between the shaft and the connector member 26, also permits the device to automatically center itself within a pipe or tube when expanded therein.

When the section of pipe has been moved to the desired location, the device may be readily released by rotation of the operating shaft in a direction to decrease the distance between the casing and the plate 26, thus moving the gripping elements 16 radially inwardly toward the shaft and away from the inside of the pipe.

Rotation of the operating shaft 10 may be accomplished in any convenient manner, such as by inserting a rod 68, shown in Figure 1, through the eye 12.

It will thus be seen that the invention as described above, provides a pipe-handling device which is of simple design and rugged construction, which is easily applied to and removed from sections of pipe in moving them from one location to another, and whereby a single pipe-handling device may be employed with numerous different sizes of pipes with equally satisfactory results.

The invention is disclosed in connection with a certain specific embodiment of the same, but it will be understood that this is by way of illustration only, and that many changes can be made in the construction and arrangement of the various parts, without departing from the spirit of the invention, or the scope of the appended claims.

Having thus clearly shown and described the invention, what is claimed as new and desired to secure by Letters Patent is:

1. A device for handling tubular articles comprising an operating shaft, a ball bearing on said shaft, a bearing support in which said bearing is rotatably mounted to permit axial rotation of said shaft relative to said support, a connector member, means connecting said member to said shaft and along which said member is movable upon rotation of said shaft, anchoring means including arms pivotally connected to one end to said support and movable radially toward and away from said shaft and surface gripping elements pivotally connected to the other ends of said arms, means connecting said anchoring means and said connector member and movable with said member to move said anchoring means into and out of engagement with a surrounding tubular article.

2. A device for handling tubular articles comprising an operating shaft, a ball bearing on said shaft, a bearing support in which said bearing is rototably mounted to permit axial rotation of said shaft relative to the support, a connector member connected to the shaft beyond said bearing and movable longitudinally relative to said shaft upon rotation of the shaft, anchoring means including arms pivotally connected at one end to said support and movable toward and away from said shaft and surface gripping elements pivotally connected to the other ends of said arms, means connecting said anchoring means and said connector member and movable with said connector member to move said anchoring means into and out of engagement with a surrounding tubular article and yieldable means engageable with the support and member to urge the member away from the support.

3. A device for handling tubular articles comprising an operating shaft, a support in which the shaft is rotatably mounted, a connector member carried by the shaft and movable therealong upon rotation of the shaft, arms connected to the support for radial movement toward and away from the shaft, surface gripping elements carried by said arms, means connecting each of the arms to said connector member for movement with said member and means positioned to coact with said member and support to yieldingly urge said member away from the support.

4. A device for handling tubular articles comprising an operating shaft, a ball bearing on said shaft, a bearing support in which said bearing is mounted to support said shaft for axial rotation in and for angular movement relative to the support, a universal joint connected to said shaft beyond the support, a connector member, means connecting said member to said joint and along which the member is movable toward and away from said support upon rotation of said shaft, means yieldably urging said connector means away from said support, anchoring means carried by said support and movable radially toward and away from said shaft, means connecting said anchoring means and said connector member and movable with said member to move said anchoring means into and out of engagement with a surrounding tubular article.

References Cited in the file of this patent

UNITED STATES PATENTS

| 679,440 | Tempest | July 30, 1901 |
| 1,235,237 | Parsons | July 31, 1917 |
| 1,804,843 | Santiago | May 12, 1931 |
| 2,386,034 | Church | Oct. 2, 1945 |

FOREIGN PATENTS

| 292,020 | Germany | May 19, 1916 |